Sept. 8, 1942.                H. T. LAMB                2,295,262
                        PORTABLE ELECTRIC DRILL
                  Filed Aug. 5, 1940            2 Sheets-Sheet 1

Inventor.
Harold Thomas Lamb.
by
Attorney.

Sept. 8, 1942.                H. T. LAMB                 2,295,262
                        PORTABLE ELECTRIC DRILL
                         Filed Aug. 5, 1940              2 Sheets-Sheet 2
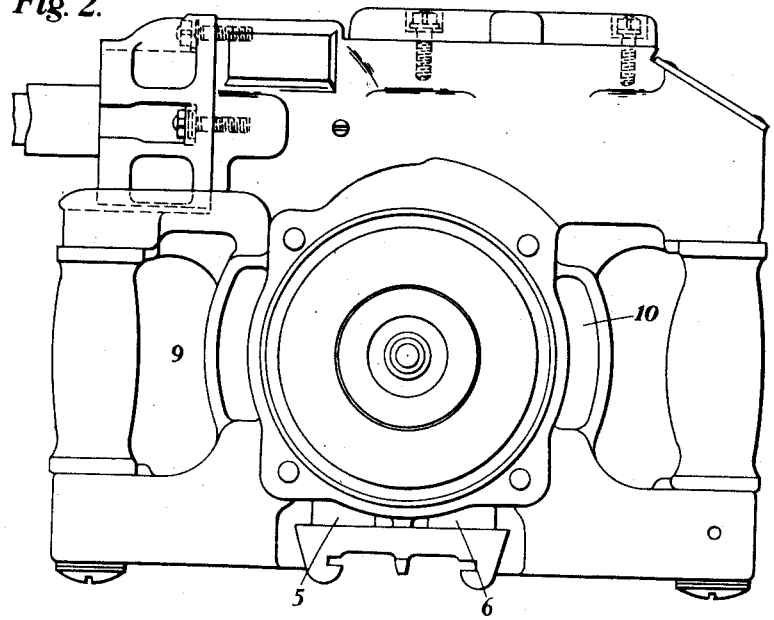
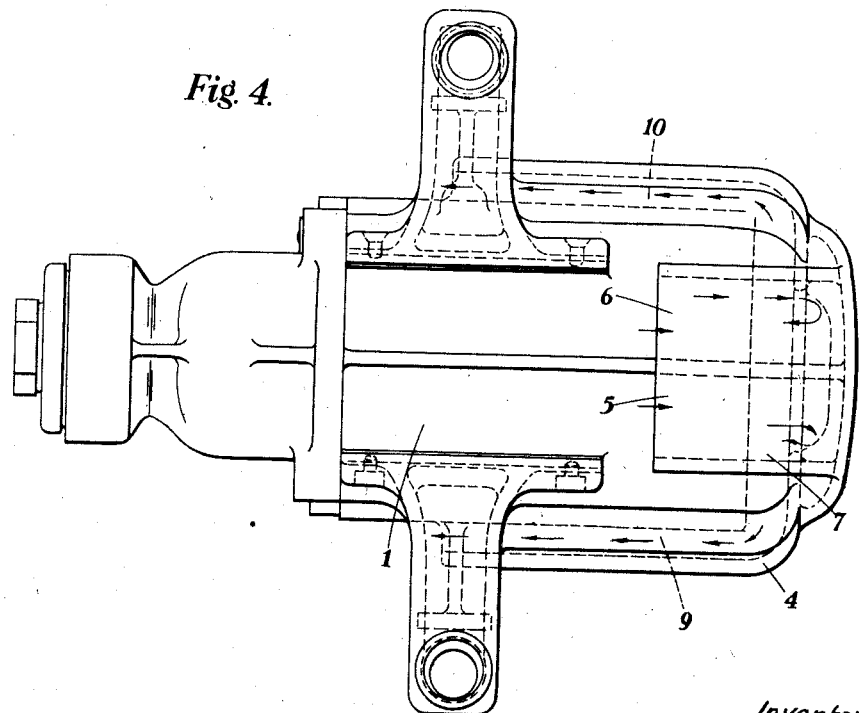
Inventor:
Harold Thomas Lamb.
by
Attorney.

Patented Sept. 8, 1942

2,295,262

UNITED STATES PATENT OFFICE 2,295,262

PORTABLE ELECTRIC DRILL

Harold Thomas Lamb,
Newcastle-on-Tyne, England

Application August 5, 1940, Serial No. 351,478
In Great Britain August 8, 1939

4 Claims. (Cl. 172—36)

This invention relates to portable flameproof electric drills and the like of the kind having a relatively short motor casing and in which the feed may be effected by the operator's pressing his body against the rear of the motor casing.

The invention has for its object the provision of improved means for the air cooling of the drill casing without introducing cooling air into the motor, and at the same time to ensure that the cooling means are not interfered with by the operator's body.

The drilling machine or the like according to the invention comprises a motor casing, a motor housed in said casing in such a manner as to be enclosed from the atmosphere, the motor shaft having a tool operating end, a fan driven by said motor at the rear end of said motor, that is to say the end remote from the tool operating end, a jacket around said motor casing, said jacket comprising a fan housing having a smooth outer rear abutment face, an air intake conduit leading to said fan housing from a point along the side of the motor casing, and an exhaust conduit leading from said fan housing and terminating at a point along said motor casing, so that when the motor is set in motion any obstruction to the passage of the air by the operator's body is obviated, the air being caused first to flow to the rear of the motor casing, through the fan housing and then towards the front of the motor casing.

With this arrangement the risk of the air passages being closed as the result of the operator pressing his body against the back of the casing is obviated as the inlet and outlet passages are situated at a considerable distance along the side of the casing, while a more effective cooling of the casing is obtained.

The invention will now be described with reference to the accompanying drawings which show its application to an electric drill.

In the said drawings—

Fig. 2 is an end view looking at the front or bit end of the machine.

Fig. 4 is a plan view of Fig. 1 viewed from beneath.

Figure 1:
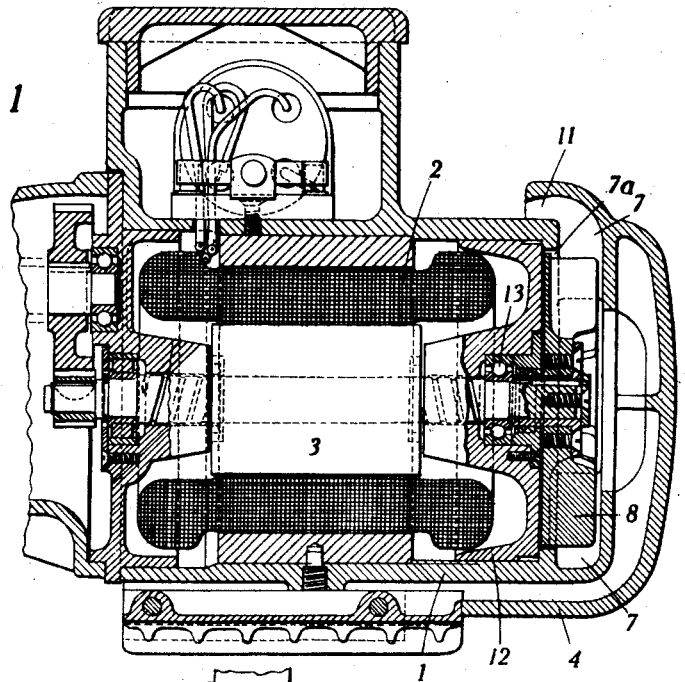
Fig. 1 is a longitudinal section.
Figure 3:
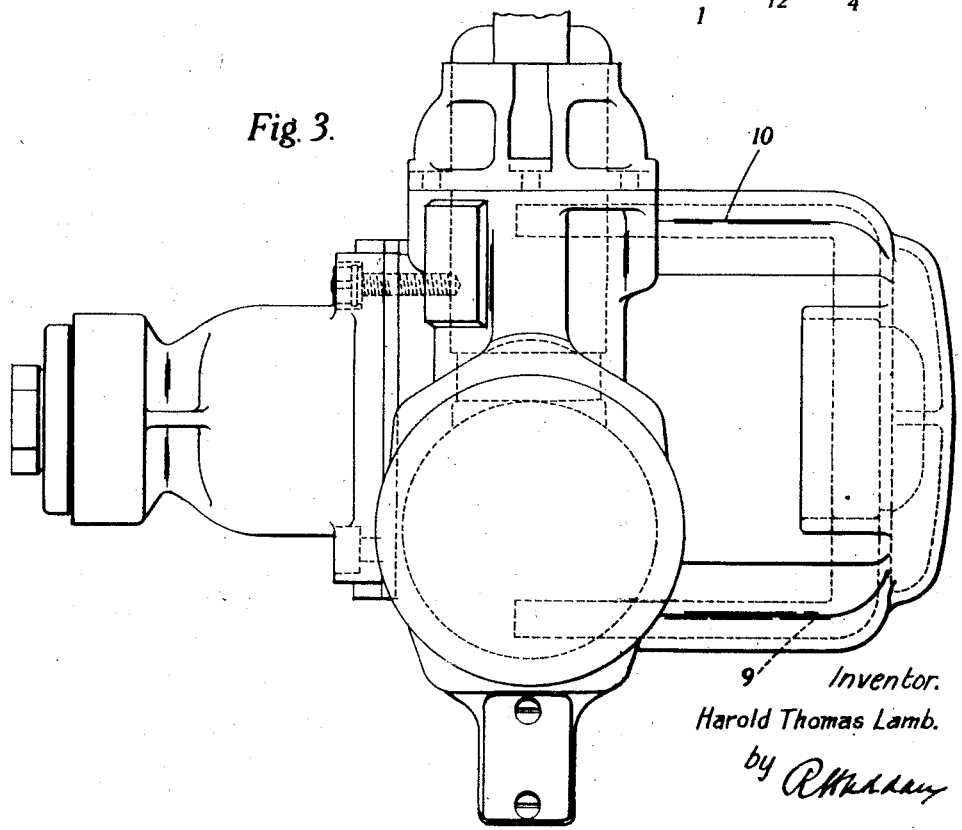
Fig. 3 is a plan view of Fig. 1.

Referring more particularly to the drawings, 1 is the motor casing, and 2, 3 the stator and rotor respectively. The motor casing 1 has cast integral therewith a jacket 4 which extends from the rear of and along a portion of the sides of the casing 1.

The said jacket 4 is divided on its lower side into two intake passages 5, 6 leading to a fan compartment 7 in which is housed a fan 8 situated at the back of the casing; and on its other sides into three exhaust passages 9, 10, 11 leading from the fan compartment 7, the passages 9, 10 terminating at a distance along the casing 1 and the other 11 terminating at a point nearer but still removed from the rear of the casing 1.

The fan compartment 7 has an opening on its inner wall 7a of a diameter sufficient to allow of the passage of the fan 8 into the said compartment so that the fan may be assembled in position from the inside of the casing 1.

The fan 8 and rotor 3 comprise a single assembly, a partition plate 12 being arranged between the rotor and fan so that when the assembly is inserted into the jacketed casing the said partition plate 12 closes the opening in the inner wall 7a of the fan compartment 1 so that the latter is sealed off from the motor compartment. In the said partition plate 12 a journal bearing 13 is arranged for the portion of the motor shaft which carries the fan 8. After the rotor and fan assembly has been placed in position the stator 2 is fitted, the motor shaft being held against axial movement by means of a front cover plate which carries another ball bearing for supporting the motor shaft.

The rotation of the fan causes air to be drawn through the twin intake passages 5, 6 into the fan compartment 7 and thence expelled through the outlet passages 9, 10, 11. Hence cooling air is moving along all sides of the casing 1. As the extremities of all the said passages are situated remote from the outer end of the casing, there is no possibility of their being obstructed by the operator's body pressing against them.

What I claim as my invention and desire to secure by Letters Patent of the United States is:

1. A portable flameproof electric drilling machine or the like comprising a motor casing, a motor housed in said casing in such a manner as to be enclosed from the atmosphere, the motor shaft having a tool operating end, a fan driven by said motor at the rear end of said motor, that is to say the end remote from the tool operating end, a jacket around said motor casing, said jacket comprising a fan housing having a smooth outer rear abutment face, an air intake conduit leading to said fan housing from a point along the side of the motor casing, and an exhaust conduit leading from said fan housing and terminating at a point along said motor casing, so that when the motor is set in motion any obstruction to the passage of the air by the operator's body is obviated the air being caused first to flow to the rear of the outer casing, through the fan housing and then towards the front of the motor casing.

2. A machine according to claim 1, wherein the motor casing and jacket are formed integral, said jacket on the one side being partitioned to form two intake passages leading to the fan housing, and on the other sides into three exhaust passages leading from said fan housing.

3. A machine according to claim 1, wherein the motor casing and fan housing are integral, the said fan housing comprising an inner wall, an opening being formed in said inner wall of a diameter sufficient to allow of the passage of the fan into said fan compartment so that the fan may be assembled in position from the inside of the motor casing.

4. A machine according to claim 1, wherein an opening is formed on the inner wall of the fan housing of a diameter sufficient to allow of the passage of the fan into said fan compartment so that the fan may be assembled in position from the inside of the casing, a partition between said fan and the motor, said partition being adapted to fit over said fan compartment opening to seal off the fan housing from the motor, a journal bearing in said partition for supporting the motor shaft, a separate stator, said stator being adapted to be slid into the machine casing, means for locking said stator in position, a cover plate, a bearing in said cover plate adapted to support the end of the motor shaft remote from the fan, said cover plate being adapted to hold the motor shaft against axial movement.

HAROLD THOMAS LAMB.